(12) United States Patent
Sujino

(10) Patent No.: US 6,247,242 B1
(45) Date of Patent: Jun. 19, 2001

(54) MECHANISM FOR DETECTING POSITION OF A MOVABLE MEMBER

(75) Inventor: Norihisa Sujino, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/267,688

(22) Filed: Mar. 15, 1999

(30) Foreign Application Priority Data

Mar. 19, 1998 (JP) .................................................. 10-071012

(51) Int. Cl.$^7$ .................................................. G01B 21/00
(52) U.S. Cl. .................................................. 33/706; 33/709
(58) Field of Search ............................ 33/700, 706, 707, 33/708, 709, 710, 712, 655, 660, 675, 430, 436, 443, 445, 446

(56) References Cited

U.S. PATENT DOCUMENTS

| 1,703,736 | * | 2/1929 | Jacob ..................................... 33/675 |
| 2,100,114 | * | 11/1937 | Walsh ..................................... 33/445 |
| 2,599,819 | * | 6/1952 | Fisher ..................................... 33/675 |
| 2,770,046 | * | 11/1956 | Wichmann ............................. 33/675 |
| 2,901,832 | * | 9/1959 | Hulen ..................................... 33/443 |
| 3,785,060 | * | 1/1974 | Brewer ................................... 33/675 |
| 5,651,187 | * | 7/1997 | Affa ....................................... 33/706 |
| 5,664,336 | * | 9/1997 | Zanier et al. ......................... 33/706 |

* cited by examiner

*Primary Examiner*—Christopher W. Fulton
(74) *Attorney, Agent, or Firm*—Arent Fox Kintner Plotkin & Kahn, PLLC

(57) ABSTRACT

A movable member is slidably mounted on a fixed member so as to be moved in a predetermined direction, and a linear sensor is attached to the fixed member, a slider is slidably mounted on the linear sensor so as to be moved in the predetermine direction. A fixed rack is attached to the fixed member, and a movable rack is slidably mounted on the fixed member and connected to the movable member so as to be moved in the predetermined direction. A first gear is pivotally mounted on the slider and engaged with the fixed rack and movable rack.

2 Claims, 8 Drawing Sheets

MECHANISM FOR DETECTING POSITION OF A MOVABLE MEMBER

BACKGROUND OF THE INVENTION

The present invention relates to a mechanism in which a linear sensor is provided to detect a position of a movable member of a device such as a car stereo and a liquid display panel, and more particularly to a mechanism which converts the movement of the movable member into a linear movement of a slider in the linear sensor.

The car stereo and liquid crystal monitor are each provided with a linear sensor to detect a moving distance of a movable portion so that the movable portion may be controlled dependent on the detected distance. A magnetoresistance linear sensor or a electric resistance linear sensor is used as the linear sensor.

Referring to FIG. 8 showing a basic construction of a magnetoresistance linear sensor, the sensor has a flat and rectangular magnetic scale 30, a detector 31 disposed opposite the magnetic scale 30 and arranged to be relatively moved with respect thereto, and a signal processing circuit 32. The magnetic scale 30 comprises a base 33 and a magnetic medium 34 formed on the base 33. A plurality of magnetic scale plates 35 are mounted on the magnetic medium 34.

The detector 31 comprises a magnetoresistance element 36 and a holder 37 for supporting the magnetoresistance element 36. The magnetoresistance element 36 opposes the magnetic scale plates 35. When the detector 31 relatively moves along the scale plates 35, an output voltage generated by the magnetoresistance element 36 is applied to the signal processing circuit 32. The signal processing circuit 32, having a preamplifier 32A and a detecting circuit 32B, calculates the quantity of relative displacement of the detector 31.

FIG. 9 shows a basic construction of an electric resistance linear sensor. The linear sensor comprises a resistor 40 formed by printing substrate. The resistor 40 has a ground terminal 41 and a source terminal 42 at both the ends thereof. A movable contact 44 is adapted to contact and to slide across the resistor 40, thereby generating a voltage which varies in accordance with the position of the movable contact 44.

In order to detect a moving distance of a movable member with such a linear sensor, the sensor is further provided with a base member on which the magnetic scale 30 or the resistor 40 is mounted. The detector 31 or the movable contact 44 is mounted on a slider which is slides along the base member. The base member is attached to a fixed member of a device while the slider is attached to the movable member.

The linear sensor is disposed in a device in consideration to space efficiency therein. Hence, the slidable range, that is the stroke of the slider, or the moving direction thereof does not always coincide with the moving range or the direction of the movable member of the device. In addition, although the slider in the linear sensor is capable only of linear movement, some of the movable members such as a flap provided in a operational flap deck are angularly displaced. Hence the movable member is mounted on the slider of the linear sensor by way of a mechanism for converting the displacement of the movable member to a linear displacement within the slidable range of the slider.

FIGS. 5 to 7 show conventional mechanisms for detecting positions.

Referring to FIG. 5, a linear sensor 73 has a sensor base 73A and a slider 73B slidably mounted on the base 73A. The base 73A is mounted, by way of an attaching portion 73C, on a fixed member 71 of the device in which the sensor 73 is provided. The slider 73B is operatively connected to a movable member 72 of the device through an arm 50. More particularly, the arm 50 has an elongated hole 50B at a center thereof with which the slider 73B is engaged. An elongated hole 50A is formed at a base end of the arm 50 with which a pivot 51 projecting from the fixed member 71 is engaged, thereby pivotally mounting the arm 50 on the fixed member 71. The other end of the arm 50 is pivotally mounted on the movable member 72 by a screw 52. Thus, when the movable member 72 moves within a range R1, the slider 73B slides on the base 73A in a range R2, so that the linear displacement of the movable member 72 is detected as the linear displacement of the slider 73B. The ratio R1:R2 is determined in accordance with the position of the hole 50B for connecting the arm 50 with the slider 73B.

Referring to FIG. 6, a connecting plate 60 is attached to the movable member 72. The connecting plate 60 has a slide groove 60A inclined at a predetermined angle with respect to the moving direction of the movable member 72. The slider 73B is engaged with the groove 60A. The linear displacement of the movable member 72 in the range R1 is detected as the linear displacement of the slider 73B in the range R2 which extends in a direction perpendicular to the moving direction of the movable member 72. The ratio R1:R2 is determined in accordance with the angular position of the slide groove 60A.

In a conventional mechanism shown in FIG. 7, a slide plate 61 is further slidably mounted on the connecting plate 60. The slide plate 61 has a pair of parallel slide grooves 61A, each engaging a shaft 62 securely mounted on the fixed member 71 and extending in a direction perpendicular to the slide plate 61. The slider 73B of the linear sensor 73 is attached to the slide plate 61. Hence, the slide plate 61 slides in parallel to the sliding direction of the slider 73B. The linear movement of the movable member 72 is converted to linear movement of the slide plate 61 in the direction perpendicular to the moving direction of the movable member 72. The movement of the slider plate 61 causes the slider 73B to move on the base 73A.

However, there are problems in the above described conventional mechanisms. In the example shown in FIG. 5, the linear movement of the movable member 72 is converted to the angular displacement of the arm 50, and the angular displacement is further converted to the sliding movement of the slider 73B which is detected by the sensor. Thus the sliding distance of the slider 73B does not become proportional to the moving distance of the movable member 72, so that the sliding distance must be corrected by calculation. As a result, in the example of FIG. 5, the construction of the circuit becomes complicated.

Moreover, in the example of FIG. 5, the rotation of the arm 50 is transmitted to the slider 73B through the elongated hole 50B so that the slider 73B is exerted with force in the rotational direction of the arm 50.

In the example shown in FIG. 7, the slider 73B is applied with force in a direction inclined with respect to the inclination of the slide groove 60A. Hence in the examples of FIGS. 5 and 7, the slider 73B cannot smoothly slide on the base 73A. Furthermore, repeated operation causes mechanical damage to the linear sensor, so that the durability of the linear sensor is deteriorated.

In the examples shown in FIGS. 5 and 6, an extremely large space is required for the arm 50 to rotate or the connecting member 60 to slide so that the mechanism takes up a large space in the device. In particular, in the example of FIG. 7, in addition to the displacement of the connecting member 60, the slide plate 61 must be further moved so that the mechanism occupies a large portion of the space in the device. Namely, all of the above described examples are inferior in space efficiency. This is a serious problem in a device such as a stereo and decks having various moving devices and controllers densely disposed within.

SUMMARY OF THE INVENTION

An object of the present invention is to provide a mechanism for detecting the position of the movable member wherein the movement of the slider of the linear sensor is in proportion to the movement of the movable member, and which does not require a large space.

According to the present invention, there is provided a mechanism for detecting position of a movable member, comprising, a fixed member, a movable member slidably mounted on the fixed member so as to be moved in a predetermined direction, a linear sensor attached to the fixed member, a slider slidably mounted on the linear sensor so as to be moved in the predetermined direction, a first gear pivotally mounted on the slider, a fixed rack attached to the fixed member at one of sides of the linear sensor extending in the predetermined direction, a movable rack slidably mounted on the fixed member and connected to the movable member at the other side of the linear sensor so as to be moved in the predetermined direction disposed in parallel with the fixed rack, the first gear being engaged with the fixed rack and the movable rack, and driving means for moving the movable member in the predetermined direction.

The mechanism further comprises a second gear having a radius different from the first gear, and the first gear and second gear engage with different racks, respectively.

These and other objects and features of the present invention will become more apparent from the following detailed description with reference to the accompanying drawings.

DETAILED DESCRIPTION OF THE PREFERRED EMBODIMENT

Figure 1:
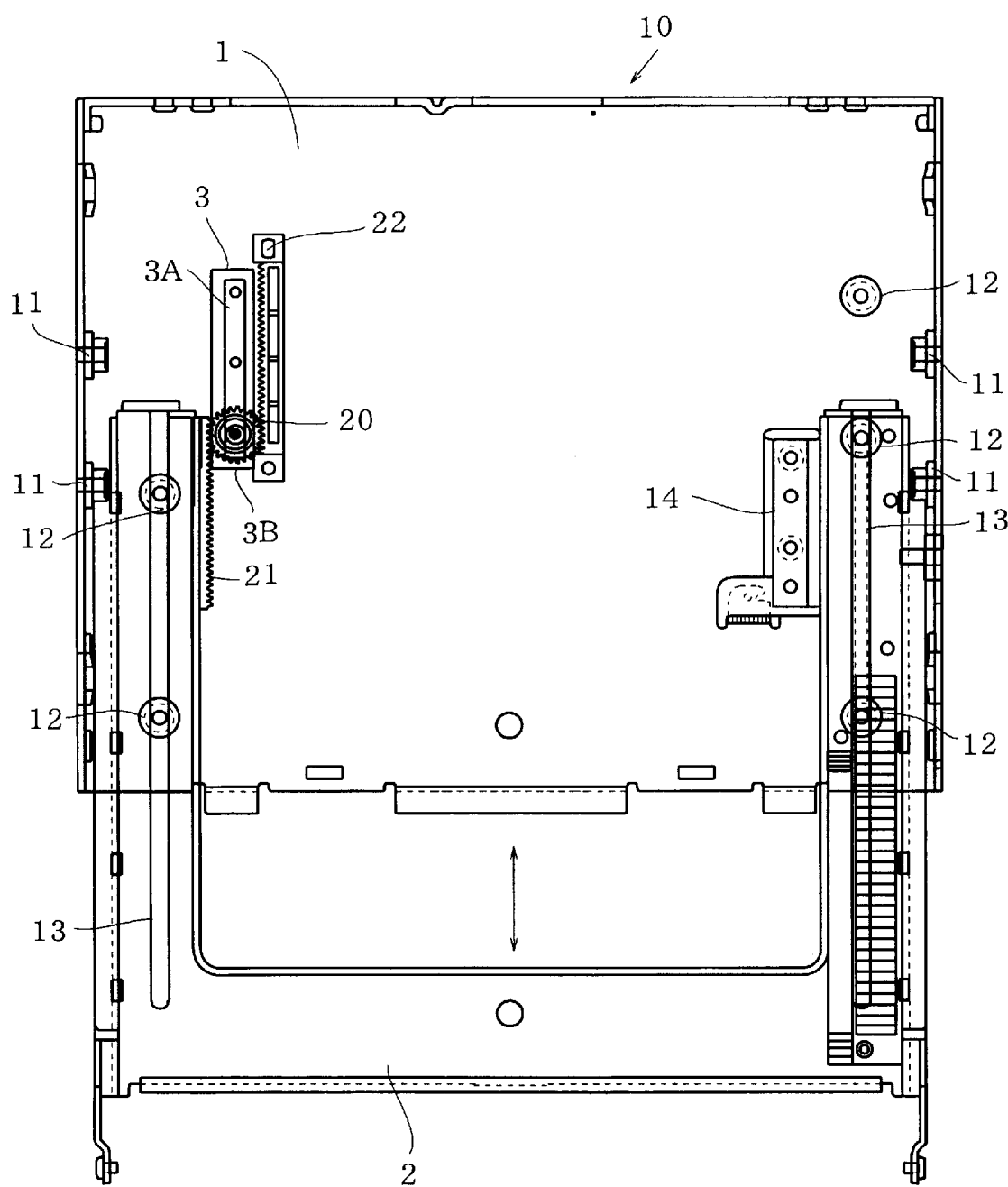
FIG. 1 is a plan view of a device provided with a mechanism for detecting position of the present invention.

Referring to FIG. 1, a device 10 to which the present invention is applied, comprises a fixed member 1 and a U-shaped movable member 2 movably mounted on the fixed member 1. A pair of guide rollers 11 are mounted on each side wall of the fixed member 1. A plurality of guide rings 12 are aligned on bottom of the fixed member 1 adjacent each side wall, the numbers thereof being three on the right side, and two on the left side. In each of the arms of the movable member 2 forming the U-shape, a longitudinal guide groove 13 is formed. Each guide groove 13 engages with the aligned guide rings 12 so that the movable member 2 can be moved in the direction shown by the arrow.

A linear or stepper motor 14 is mounted on the fixed member 1 adjacent the right arm of the movable member 2. Adjacent the left arm, a linear sensor 3 is attached to the fixed member 1.

Figure 2:
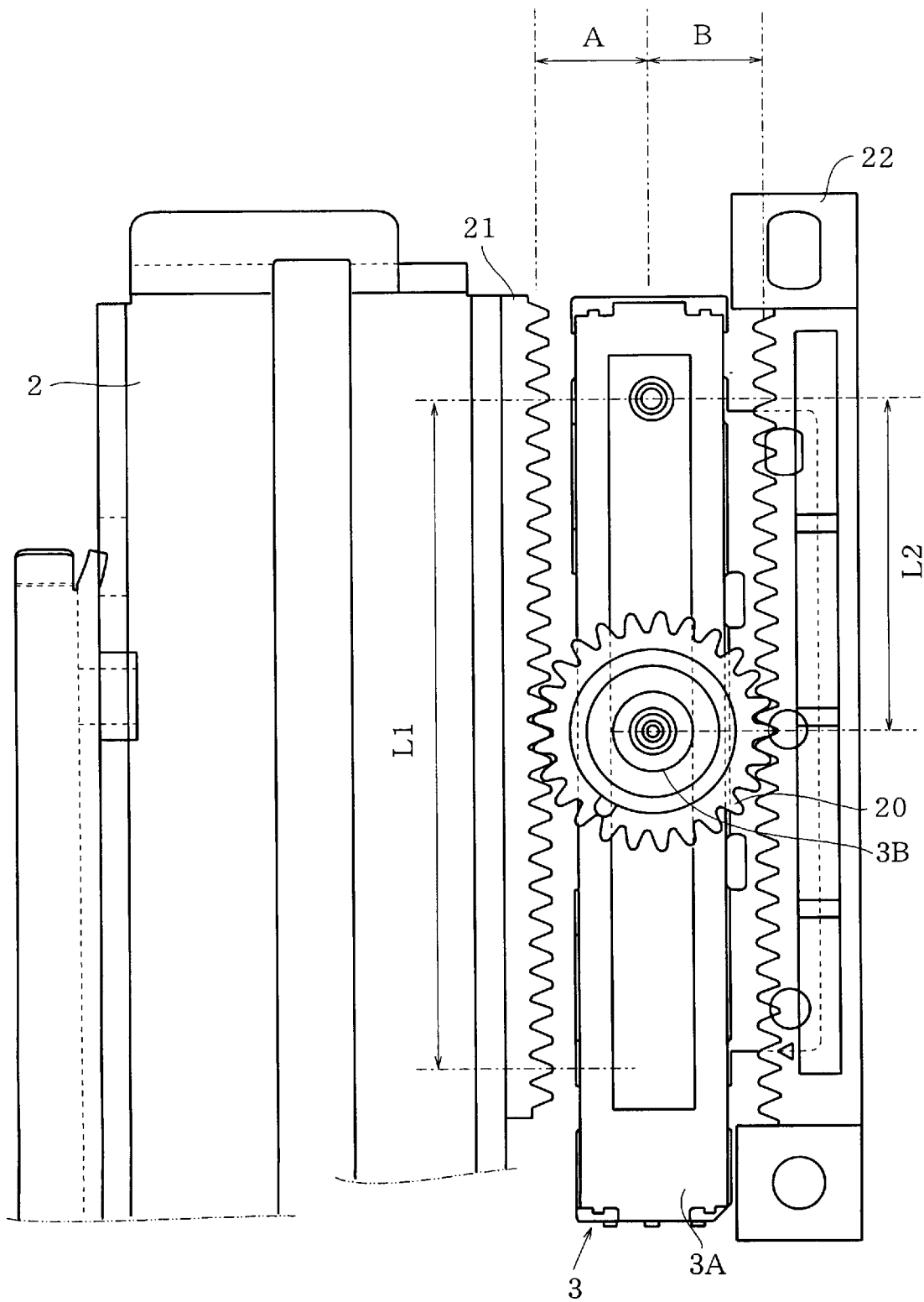
FIG. 2 is a plan view showing the mechanism of FIG. 1 is detail.

Referring to FIG. 2, the linear sensor 3 comprises a base 3A securely attached to the fixed member 1, and a slider 3B slidably mounted on the base 3A. A gear 20 is pivotally mounted on the slider 3B. The gear 20 engages with a fixed rack 22 attached to the fixed member 1, and with a movable rack 21 which is disposed on the inner side of the left arm of the movable member 2 in the moving direction thereof. The base 3A of the linear sensor 3 is so arranged as to allow the slider 3B to slide in parallel with the movable rack 21 and with the fixed rack 22. Thus, each of the operating portions of the fixed rack 22, linear sensor 3, and the movable rack 21 opposes one another.

In operation, when the movable member 2 moves, the movable rack 21 is moved in the same direction, thereby rotating the gear 20 about a shaft of the slider 3B. The gear 20 is hence rotated along the fixed rack 22 to slide the slider 3B in parallel with the racks 21 and 22. If the movable member 2 is moved a distance L1, the slider 3B slides a distance L2. The relationship between the distances L1 and L2 is expressed as, $$L2 = L1 \times B/(A+B)$$

wherein A is a distance between the center of the slider 3B and the movable rack 21 and B is a distance between the center of the slider 3B and the fixed rack 22. In the present embodiment, the distances A and B correspond to the radius of the pitch circle of the gear 20. Since A=B, $$L2 = (\tfrac{1}{2}) \times L1$$

Hence the distance L2 is proportional to the distance L1.

Moreover, since the gear 20 which directly moves the slider 3B travels on the fixed rack 22, which is disposed in parallel to the moving direction of the slider 3B, the slider 3B is not exerted with force except for the force in the sliding direction.

Figure 3:
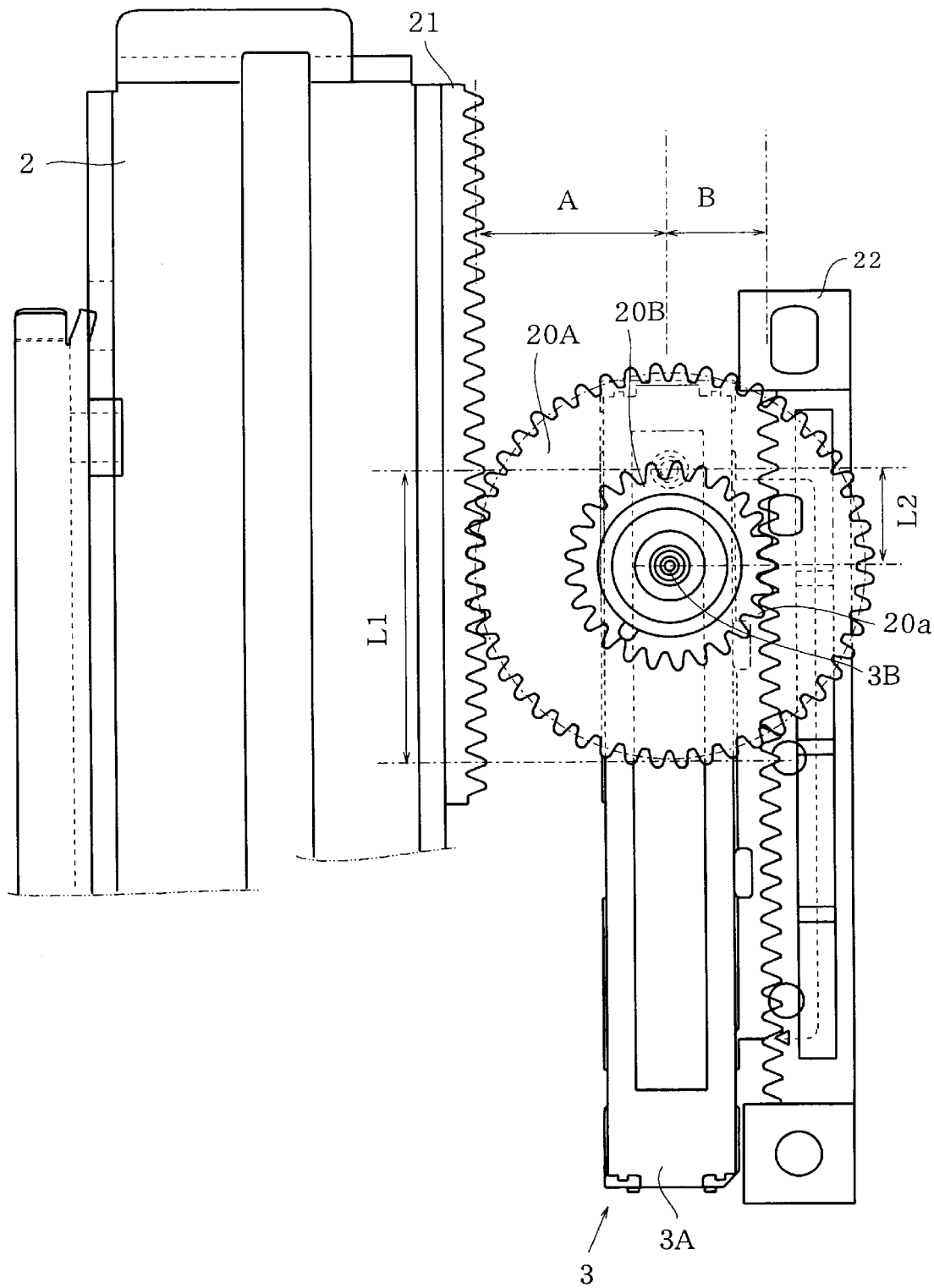
FIG. 3 is a plan view showing a second embodiment of the mechanism according to the present invention.

Referring to FIG. 3, the second embodiment of the present invention is provided with a double gear device 20a instead of the gear 20. The double gear device has a large diameter gear 20A and a small diameter gear 20B which is coaxial and integral with the large diameter gear 20A. The large diameter gear 20A meshes with the movable rack 21 and the small diameter gear 20B meshes with the fixed rack 22. The other constructions are the same as that of the first embodiment.

The relationship between the moving distance L1 of the movable member 2 and the sliding distance L2 of the slider 3B is expressed as, $$L2 = L1 \times B/(A+B)$$

In the present embodiment, when A=2B, namely, when the radius of the small diameter gear 20B is one half of that of the large diameter gear 20A, the following equation is obtained.

$$L2 = (1/3) \times L1$$

The distance A which is the radius of the large diameter gear 20A is larger than the distance B which is the radius of the small diameter gear 20B so that the sliding range of the slider can be decreased, thereby enabling to decrease the size of the linear sensor 3.

Figure 4:
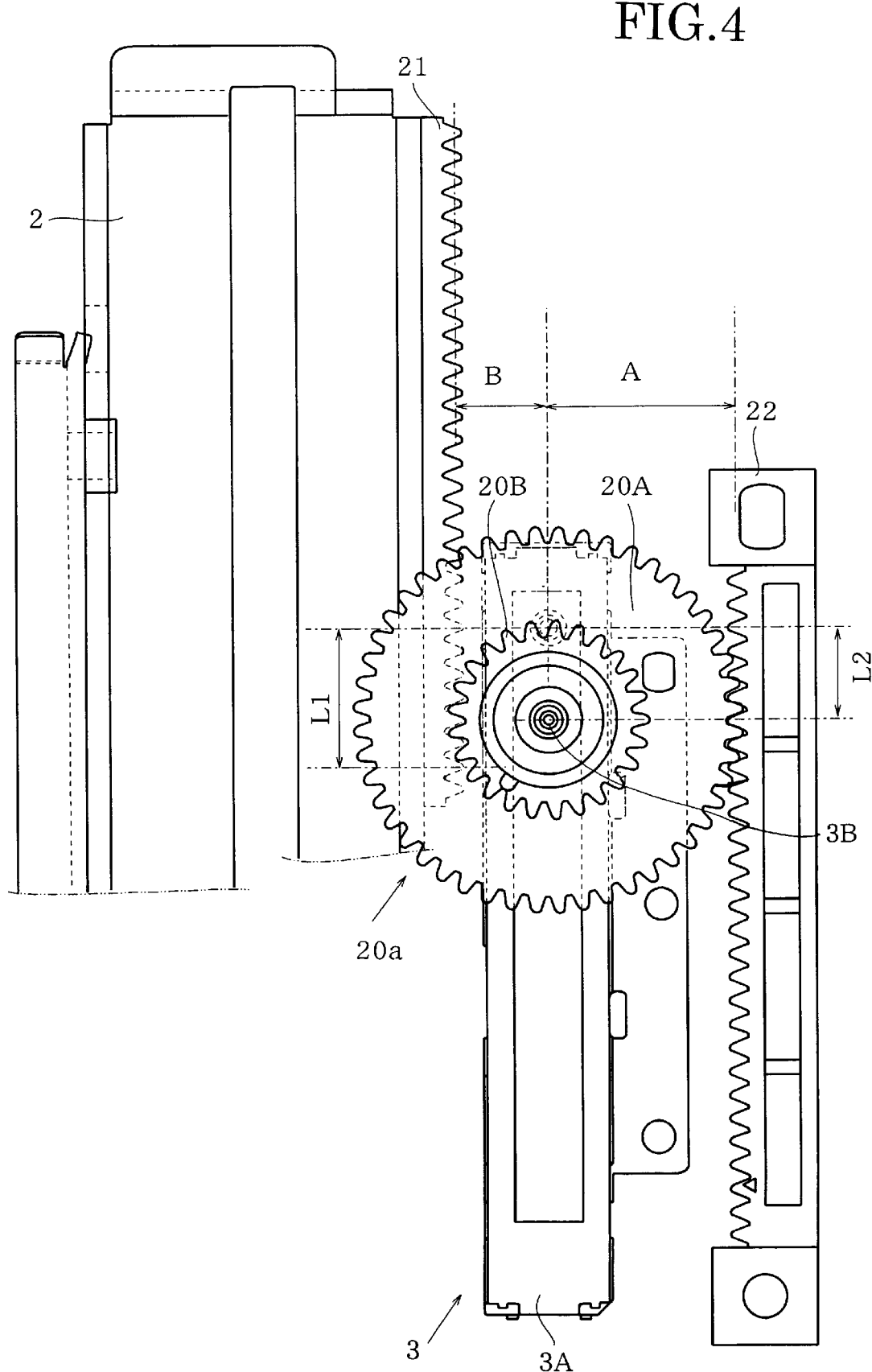
FIG. 4 is a plan view showing a third embodiment of the mechanism according to the present invention.
Figure 5:
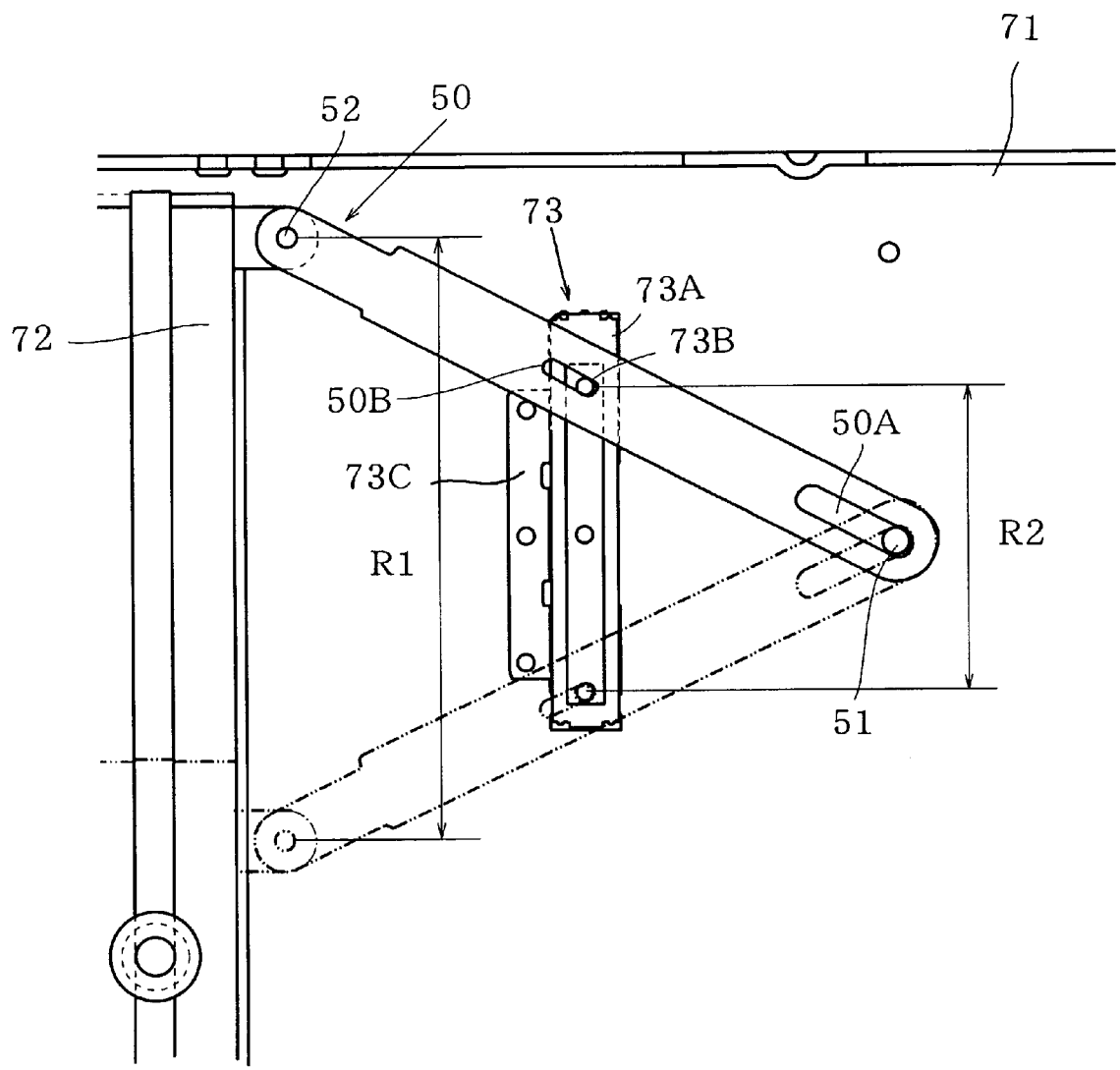
FIG. 5 is a plan view of a conventional mechanism for detecting position.
Figure 6:
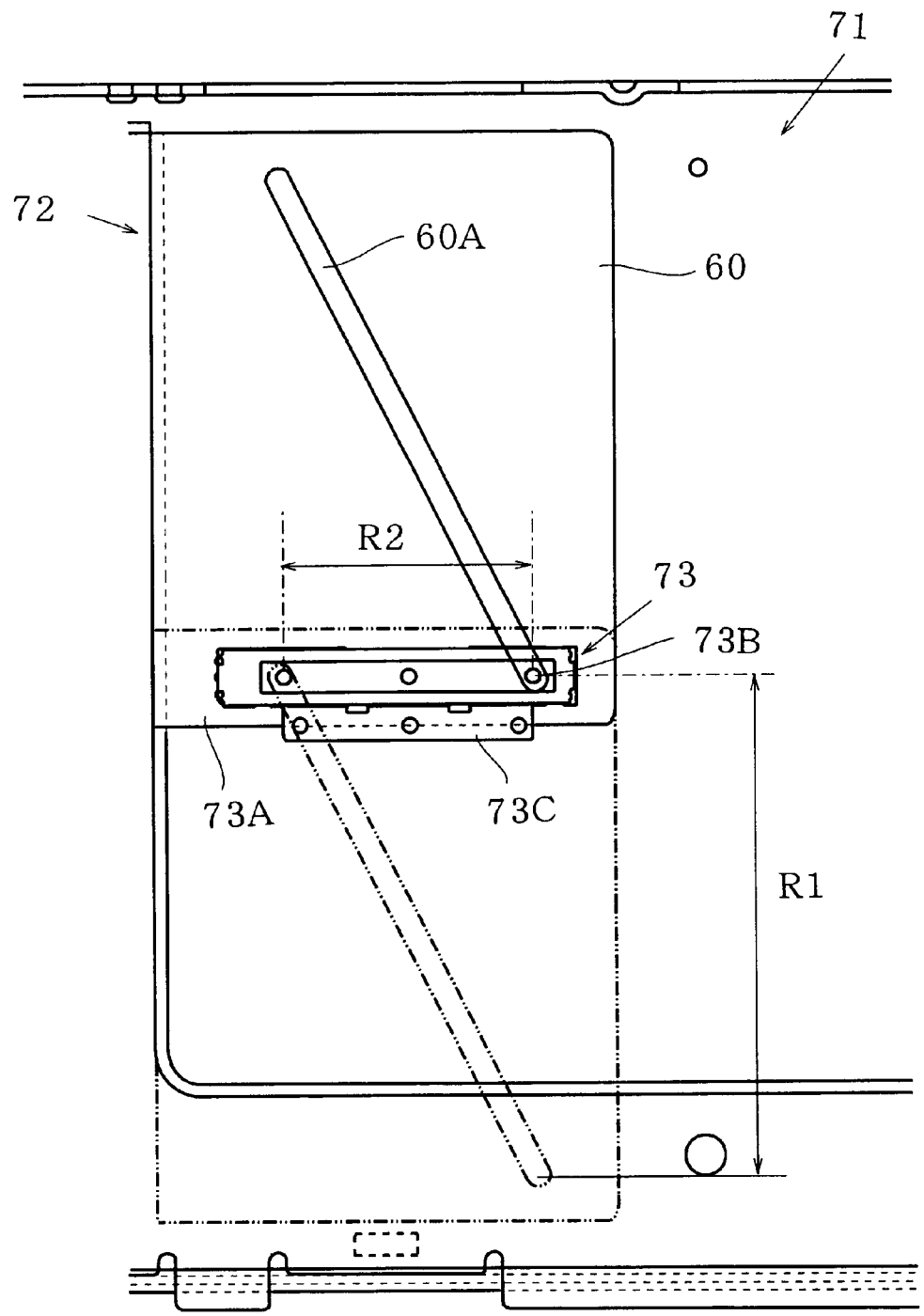
FIG. 6 is a plan view of another conventional mechanism for detecting position.
Figure 7:
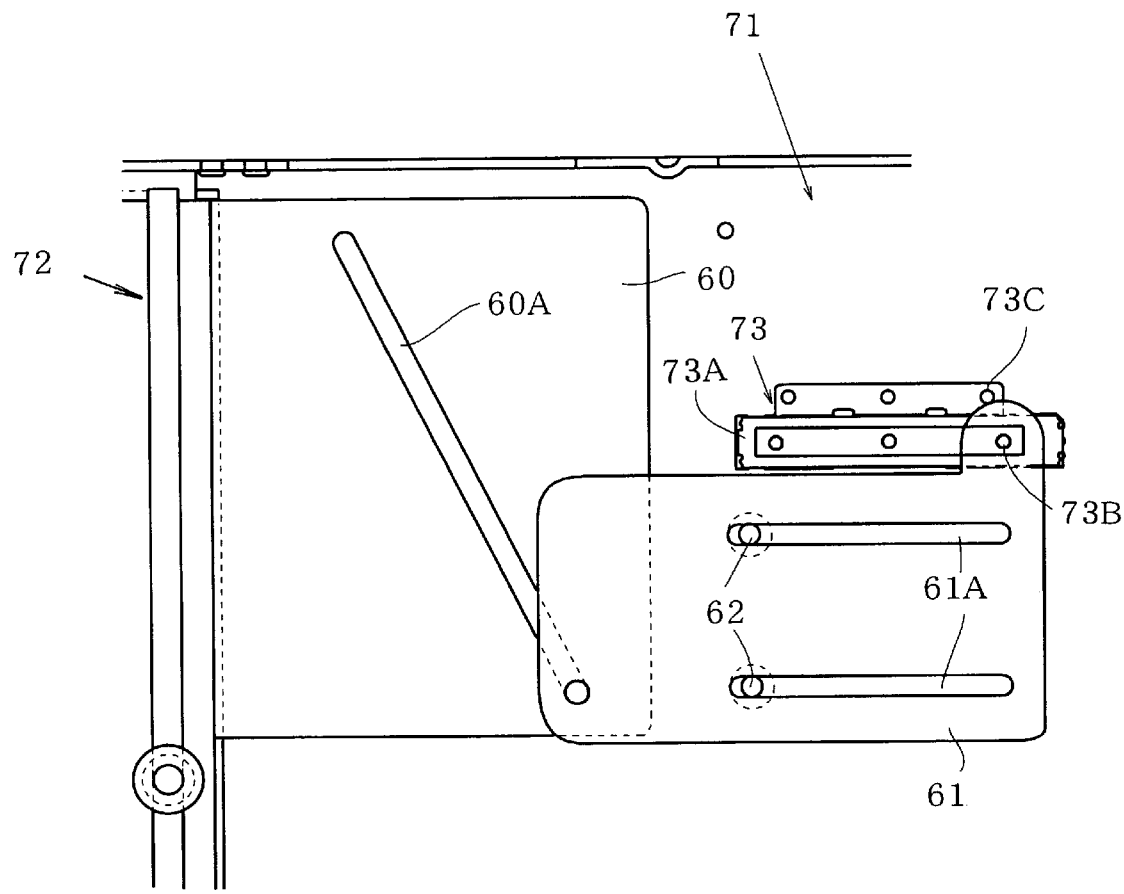
FIG. 7 is a plan view of another conventional mechanism for detecting position.
Figure 8:
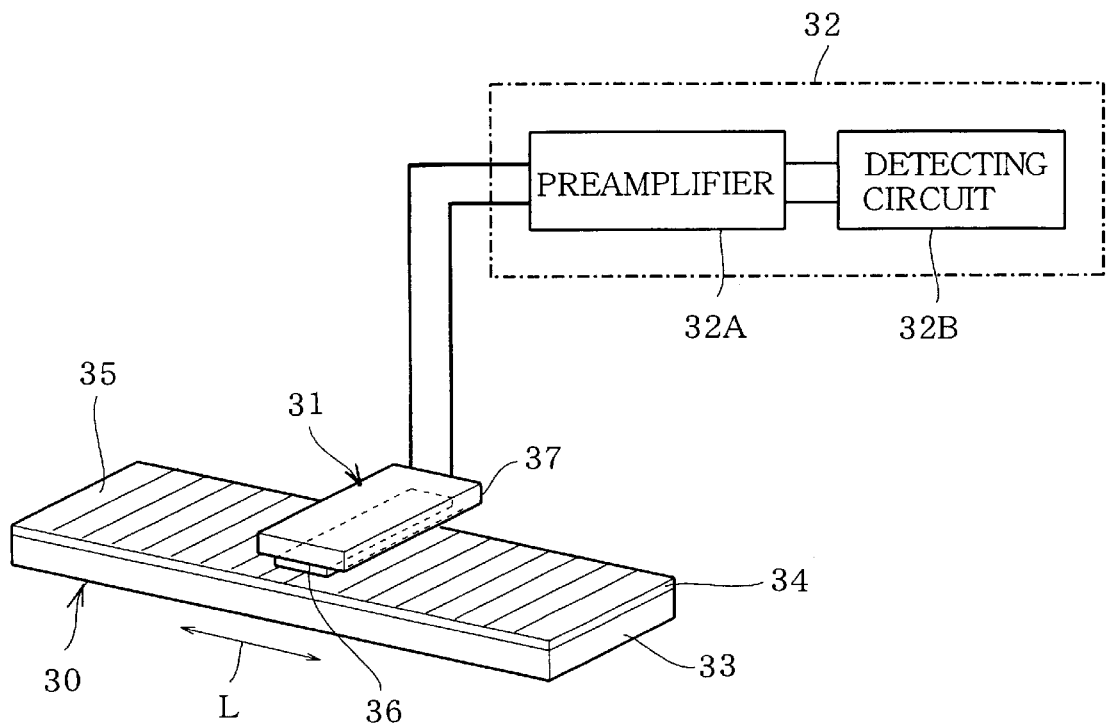
FIG. 8 is an illustration of a magnetoreistance linear sensor, explaining the principle thereof.
Figure 9:
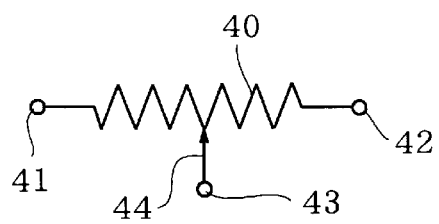
FIG. 9 is a diagram explaining a electric resistance linear sensor in principle.

Referring to FIG. 4, in the third embodiment of the present invention, the relationship between the gears 20A and 20B and the racks 21 and 22 are modified. Namely, the large diameter gear 20A meshes with the fixed rack 22 while the small diameter gear 20B meshes with the movable gear 21. Hence the relation between the distances L1 and L2 is expressed as, $$L2 = L1 \times A/(A+B)$$

When, A=2B, the above equation is modified as, $$L2 = (2/3) \times L1$$

In accordance with the present invention, the mechanism for detecting the position of the movable member uses a gear and a pair of racks so that the following advantages are obtained.

(1) The sliding distance of the slider of the linear sensor is in proportion to the moving distance of the movable member so that the circuit for detecting the position of the movable member can be simplified.

(2) Since a driver for directly moving the linear sensor moves along the sliding direction of the slider, the slider is not applied with extra force exerted in the direction besides the moving direction of the slider. Hence the slider can slide smoothly, thereby improving the accuracy of the detection. Moreover, since the mechanical damage is decreased, the durability of the linear sensor is improved.

(3) The space for disposing the mechanism is sufficient as long as the gear can be disposed and moved therein. Hence it is not necessary to provide a large space in the device.

While the invention has been described in conjunction with preferred specific embodiment thereof, it will be understood that this description is intended to illustrate and not limit the scope of the invention, which is defined by the following claims.

What is claimed is:

1. A mechanism for detecting position of a movable member, comprising:

a fixed member;

a movable member slidably mounted on the fixed member so as to be moved in a predetermined direction;

a linear sensor attached to the fixed member;

a slider slidably mounted on the linear sensor so as to be moved in the predetermined direction;

a first gear pivotally mounted on the slider;

a fixed rack attached to the fixed member at one of sides of the linear sensor extending in the predetermined direction;

a movable rack slidably mounted on the fixed member and connected to the movable member at the other side of the linear sensor so as to be moved in the predetermined direction disposed in parallel with the fixed rack;

the first gear being engaged with the fixed rack and the movable rack; and driving means for moving the movable member in the predetermined direction.

2. A mechanism for detecting position of a moveable member, comprising:

a fixed member;

a moveable member slidably mounted on the fixed member so as to be moved in a predetermined direction;

a linear sensor attached to the fixed member;

a slider slidably mounted on the linear sensor so as to be moved in the predetermined direction;

a first gear pivotally mounted on the slider;

a fixed rack attached to the fixed member at one side of the linear sensor extending in the predetermined direction;

a moveable rack slidably mounted on the fixed member and connected to the movable member at an other side of the linear sensor so as to be moved in the predetermined direction disposed in parallel with the fixed rack;

driving means for moving the moveable member in the predetermined direction; and a second gear coaxial to and integral with said first gear and having a radius different from the first gear;

wherein the first gear and second gear engage different racks, respectively.

\* \* \* \* \*